Jan. 15, 1957   J. R. CLIFTON   2,777,656
AUXILIARY FUEL CELL
Filed April 28, 1953
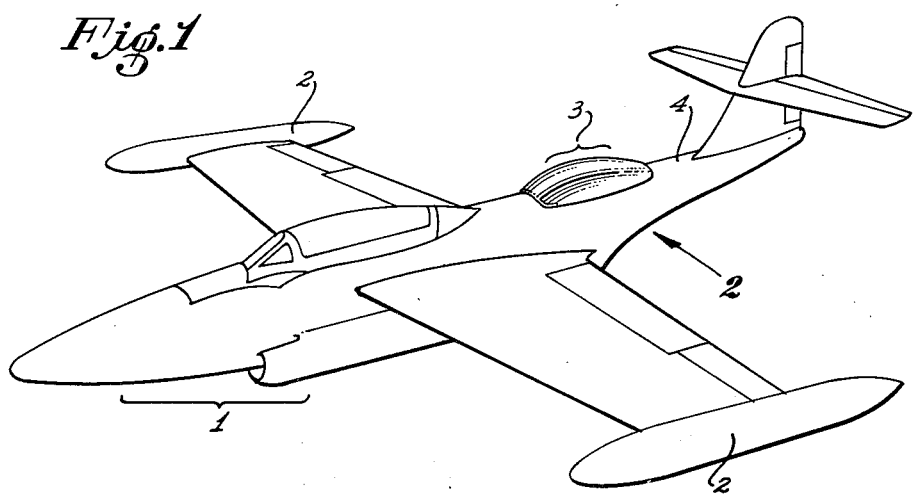
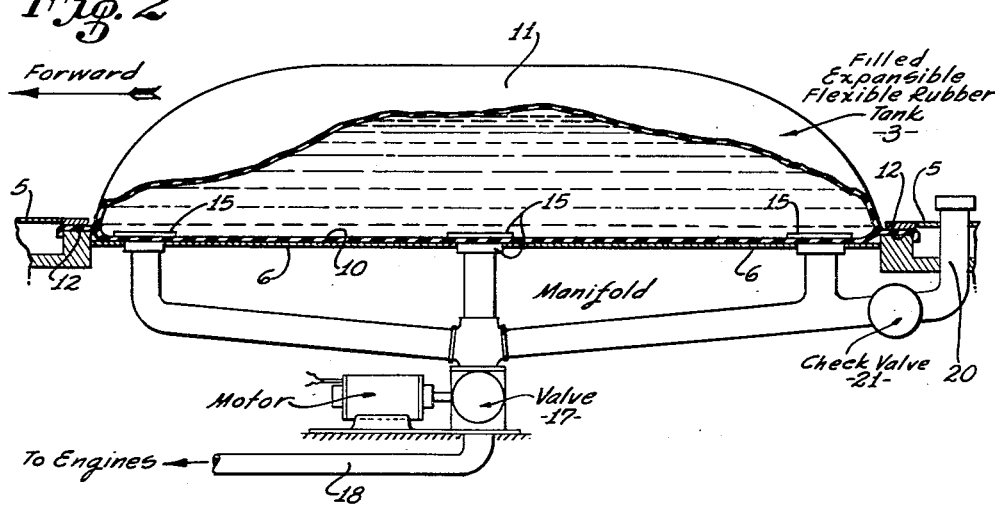
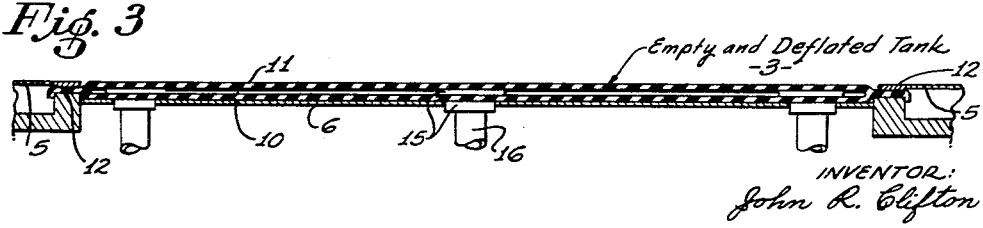
INVENTOR:
John R. Clifton
By Herbert E. Metcalf
His Patent Attorney

United States Patent Office 2,777,656
Patented Jan. 15, 1957

2,777,656

AUXILIARY FUEL CELL

John R. Clifton, Rolling Hills, Calif., assignor to Northrop Aircraft, Inc., Hawthorne, Calif., a corporation of California Application April 28, 1953, Serial No. 351,643

5 Claims. (Cl. 244—135)

My invention relates to airplane fuel tanks.

Modern miltiary airplanes, particularly airplanes driven by jet engines, have limited range when the engine fuel is carried solely within the fuselage and/or wings of the airplane. Consequently, resort is commonly had to auxiliary external fuel tanks such as wing tip tanks, releasable or permanent; or pod tanks suspended beneath wings or fuselage, releasable or permanent. If these auxiliary tanks are permanently attached, a permanent drag penalty is imposed on the airplane. If the tanks are releasable from the aircraft in flight, the drag penalty only exists until the fuel is used and the tank dropped, but the cost is high due to loss of the releasable auxiliary tanks during each flight.

The present invention has for an object the provision of an airplane fuel tank which, when loaded with auxiliary fuel, does increase drag initially, but which, when the auxiliary fuel is consumed, restores the normal contour of the airplane to eliminate the drag, without dropping any part of the tank. Thus the advantages of both permanent and disposable tanks are realized, without the specific disadvantages of each.

It is another object of the invention to provide a fuel tank that is proportional in size to the amount of fuel in the tank.

It is still another object of the invention to provide a fuel tank for an airplane wherein the drag imposed on the airplane is only proportional to the amount of fuel in the tank.

In brief my invention comprises a tank located near any surface of any part of the airplane, wings or fuselage, the outer wall of the tank forming the normal minimum drag design contour of a portion of the exterior skin of the aircraft. This outer wall is movable outwardly to project into the airstream moving past the airplane against a stress tending to hold the wall in its original position, by auxiliary fuel inserted under pressure in the tank. The tank, in this position, adds an initial drag to the airplane. However, as the auxiliary fuel is used up in flight, preferably during the initial portion thereof, the stress placed on the outer wall of the tank returns this wall to the original airplane surface contour, thereby removing the initial drag. A preferred outer wall is made of elastic material stressed and stretched to conform to the normal minimum drag surface contour.

My invention will be more fully understood by reference to the appended drawings in which:

Figure 1 is a perspective view of a jet propelled airplane embodying one form of the fuel tank of the present invention.

Figure 2 is a longitudinal view of the full fuel tank of Figure 1, taken as indicated by the arrow 2 in Figure 1.

Figure 3 is a longitudinal sectional view of the same tank in empty condition.

Referring first to Figure 1, a jet airplane 1 is provided with wing tip fuel tanks 2 of the permanent type, and also with an expansible tank 3 constructed in accordance with the present invention, as shown in Figures 2 and 3, and installed on the upper surface 4 of the airplane fuselage.

As shown, the metal skin 5 of the airplane over a predetermined exterior surface area thereof, is formed with a depressed tank support portion 6 forming a tank support, this depressed portion however being curved as required to be equally spaced throughout to what would properly be the normal minimum drag exterior surface contour for that area.

The tank 3 has a basal wall 10 bedded on the depressed tank support portion 6, and an elastic expandible outer wall 11 which is prestretched for air loads. These walls 10 and 11 are edge joined to provide an edge flange 12 which is clamped or otherwise secured to the airplane, to hold the tank 3 on the airplane 1 in the proper position.

Both walls 10 and 11 can be made of one-fourth inch synthetic rubber with the bottom wall 10 being reinforced with fabric if desired.

The bottom wall 10 is preferably adhesively secured to the tank support portion 6, and also by outlet pipe flanges 15 which secure outlet pipe manifold 16 to the airplane. Outlet manifold 16 delivers fuel to a motor controlled valve 17 through which fuel passes to fuel line 18 leading to the airplane engine fuel pumps, and thence to the jet engines.

When tank 3 is empty as shown in Figure 3, the outer and basal walls are parallel and at least the outer wall 11 is stretched to tightly fit over the basal wall 10 thereby causing the outer wall 11 to assume the desired exterior surface contour over the tank area. The uniform depression distance of the depressed tank support portion 6 is such as to bring the outer tank wall 11 flush with the surrounding fuselage skin 5 when the tank 3 is empty. Consequently in empty condition, the outer wall 11 of the tank conforms to the normal skin 5 contour as designed for minimum drag over the tank location area. In other words, in empty condition the tank 3 adds no parasitic drag whatever to the airplane.

Fuel is inserted in the tank 3 under pressure through filler pipe 20 and check valve 21 with motor valve 17 closed. As fuel is forced into the tank 3, the outer and basal walls 11 and 10 thereof separate, and the outer wall 11, by virtue of its elasticity, expands to extend outwardly into the airstream as a protuberance or blister somewhat as shown in Figure 1. Of course in this condition the tank does add drag to the airplane.

However, after fuel insertion, when valve 17 is opened and fuel is used from the tank 3, as the fuel is used, the elastic stress in the outer wall 11 of the tank gradually reduces the amount of projection of the wall 11 into the airstream, and likewise gradually reduces the parasite drag on the airplane until the fuel is entirely consumed, at which time the tank wall 11 no longer protrudes and the parasite drag on the airplane is eliminated. It is to be noted in this respect that the parasite drag of the tank of the present invention is proportionally reduced as fuel is consumed, whereas in the releasable drop tanks of the prior art, the parasite drag is the same irrespective of the amount of fuel in the tank until the tank is dropped. Consequently, tanks of the present invention compound the range extension obtained for the airplane equipped therewith. It is of course preferred to use the fuel in the tank of the present invention during the initial portion of a flight.

It has been found that in the airplane illustrated in Figure 1 (U. S. A. F. F–89) at least 250 gallons of fuel can be stored at take-off in the tank as described, and that this fuel will be sufficient to complete a take-off and an initial climb out to about 35,000 ft. altitude, after which time the tank fuel is entirely consumed and normal drag is restored.

While I have described the blister tank of the present invention as being located on the upper surface of the fuselage, other suitable locations will suggest themselves to those skilled in the art.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An airplane having a particular area of the external surface thereof formed from material stressed to maintain a predetermined surface contour position in flight, means inside of said area connected to said material to form a chamber of which said material is the external wall, means for inserting fuel under pressure into said chamber from outside said airplane to force said material outwardly into the airstream over said particular area thereby to increase the capacity of said chamber, and means for conducting fuel from said chamber into the engines of said airplane, the stress on said material acting to return said material toward the original surface contour position as fuel in said chamber is consumed.

2. An airplane having a particular area of the external surface thereof formed from elastic material prestressed to maintain a predetermined surface contour position in flight, means inside of said area sealed to said elastic material to form a chamber of which said elastic material is the external wall, means for inserting fuel under pressure into said chamber from outside said airplane to distend said elastic material outwardly into the airstream over said particular area thereby to increase the fuel capacity of said chamber, and means for conducting fuel from said chamber into the engines of said airplane.

3. In an airplane, a fuel tank having a base conforming to the contour of an external surface of said airplane, and a closure of distendable elastic material stretched over said base to form the exterior skin of said airplane over said base, the edge of said closure being sealed to said base to form a fuel tight chamber between said base and said closure, means for inserting fuel in said tank from outside said airplane, and means for removing fuel from said tank for use inside said airplane.

4. In an airplane, a fuel tank comprising a tank base adjacent an exterior surface of said airplane, a fuel conducting connection to said base, and a tank closure over said base and sealed at the edges thereto, said closure being of an elastic material prestressed to conform to the contour of said base and positioned to form the exterior skin of said airplane over said base, said closure being distendable outwardly into the airstream by fuel inserted between said base and said closure, and elastically returnable toward said initial position as fuel is used from said tank, a filler pipe opening on the outer skin of said airplane and connected to said fuel conducting connection, and a conduit connecting said fuel conducting connection to the engines of said airplane.

5. In an airplane: fuel carrying means comprising a tank of variable capacity mounted on said airplane, said tank having an elastic wall of variable area stressed over a predetermined area of the exterior surface of said airplane and conforming in shape to the contour of said exterior surface when said tank is substantially empty of fuel, said wall being distendable outwardly from said exterior surface of said airplane as fuel under pressure is inserted into said tank, said elastic wall being movable inwardly toward said exterior surface as fuel is withdrawn from said tank, filler means for inserting fuel into said tank under pressure, and fuel withdrawal means for withdrawing fuel from said tank for use in said airplane.

References Cited in the file of this patent

UNITED STATES PATENTS

| | | |
|---|---|---|
| 1,364,770 | Lindberg | Jan. 4, 1921 |
| 1,754,883 | Dorr | Apr. 15, 1930 |
| 1,824,280 | Koun | Sept. 22, 1931 |
| 2,131,528 | Soyer | Sept. 27, 1938 |
| 2,378,528 | Arsandaux | June 19, 1945 |
| 2,385,499 | Darby | Sept. 25, 1945 |
| 2,623,721 | Harrington | Dec. 30, 1952 |
| 2,653,780 | Pepersack | Sept. 29, 1953 |

FOREIGN PATENTS

| | | |
|---|---|---|
| 656,741 | France | Jan. 5, 1929 |
| 977,700 | France | Nov. 15, 1950 |